(12) United States Patent
Hara et al.

(10) Patent No.: US 7,045,759 B2
(45) Date of Patent: May 16, 2006

(54) NIGHT VISION SYSTEM AND CONTROL METHOD THEREOF

(75) Inventors: Yoshimasa Hara, Nagoya (JP); Shotaro Eguchi, Kariya (JP); Yasuo Hagisato, Susono (JP); Ryuji Yamaguchi, Mishima (JP); Kunihiko Toyofuku, Toyota (JP); Shinya Kawamata, Gotenba (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 275 days.

(21) Appl. No.: 10/370,701

(22) Filed: Feb. 24, 2003

(65) Prior Publication Data

US 2003/0160153 A1 Aug. 28, 2003

(30) Foreign Application Priority Data

Feb. 27, 2002 (JP) ........................ 2002-051447

(51) Int. Cl.
*H01J 40/14* (2006.01)

(52) U.S. Cl. ........................................ 250/214
(58) Field of Classification Search .................. 250/214
See application file for complete search history.

(56) References Cited

U.S. PATENT DOCUMENTS

| 5,414,439 | A | * | 5/1995 | Groves et al. | |
| 6,774,367 | B1 | * | 8/2004 | Stephan et al. | 250/330 |
| 2003/0173517 | A1 | * | 9/2003 | Seto | 250/330 |

FOREIGN PATENT DOCUMENTS

| DE | 195 09 035 A1 | 9/1995 |
| EP | 0 470 579 A2 | 2/1992 |
| JP | A 3-54033 | 3/1991 |
| JP | 7-066992 | 3/1995 |
| JP | 11-243538 | 9/1999 |
| JP | 2000-270266 | 9/2000 |
| JP | 2001-016578 | 1/2001 |

OTHER PUBLICATIONS

Mulvanny et al.; "Advanced Systems for Automotive Applications Digital Camera Systems–The Big Picture"; SPIE; vol. 3088; 1997; pp 205–216.

* cited by examiner

*Primary Examiner*—David Porta
*Assistant Examiner*—Marcus Taningco
(74) *Attorney, Agent, or Firm*—Oliff & Berridge, PLC

(57) ABSTRACT

A second circuit separately extracts a synchronization signal and brightness signal from an image signal output from a camera for capturing an image of a subject. A gamma amplifier produces a gamma correction signal based on a brightness ratio characteristic in which a display brightness increases as the signal level of the brightness signal increases and the display brightness is set using a display brightness correction ratio which is preferably 70 to 90% of an equi-proportional display brightness correction ratio when the signal level of the brightness signal falls in a high-brightness range. A liquid crystal display receives the gamma correction signal and displays an image captured by the camera with the display brightness set in accordance with the brightness ratio characteristic while synchronizing with a drive timing signal output from a first circuit. Thus, the difference in display brightness between different high-brightness regions or subjects is made large, whereby halation which may otherwise occur between those regions or subjects can be prevented.

20 Claims, 5 Drawing Sheets

NIGHT VISION SYSTEM AND CONTROL METHOD THEREOF

INCORPORATION BY REFERENCE

The disclosure of Japanese Patent Application No. 2002-051447 filed on Feb. 27, 2002, including the specification, drawings and abstract is incorporated herein by reference in its entirety.

BACKGROUND OF THE INVENTION

1. Field of Invention

The invention relates to a night vision system and a control method thereof.

2. Description of Related Art

There is known a so-called night vision system which captures an image of a subject by receiving infrared lights projected from the night vision system and reflected by the subject or infrared lights emitted from the subject by means of an infrared camera and which displays the captured image on a display. Using infrared lights, such a night vision system is able to reliably capture images, and is therefore expected to be widely used as a driving assistance system for motor vehicles, and the like, for improving the visibility at night. With conventional displays, however, when the brightness of a subject desired to clearly appear on the screen is lower than the brightness of a region surrounding the subject or the brightness of other subjects located in the vicinity thereof, it is difficult to distinguish that subject due to the brightness of its periphery, namely due to the halation.

SUMMARY OF THE INVENTION

It is therefore an object of the invention to provide a night vision system which prevents a lower-brightness subject located in the vicinity of a high-brightness region of an image from being obscured from view due to the halation, thus enabling the entire regions of the image, each having a different level of brightness from low to high level, to be appropriately displayed.

A first aspect of the invention relates to a night vision system. This night vision system includes a display and controller that displays an image on the display. The controller includes a gamma amplifier which receives a brightness signal constituting an image signal indicative of an image to be displayed on the display; produces a gamma correction signal from the received brightness signal based on a brightness ratio characteristic in which a display brightness is set to a maximum brightness using a first brightness correction ratio when the signal level of the brightness signal is a maximum signal level and the display brightness is set using a second brightness correction ratio which is lower than the first brightness correction ratio when the signal level of the brightness signal is lower than the maximum signal level; and outputs the produced gamma correction signal to the display. The brightness correction ratio is a ratio between a signal indicative of a display brightness and a brightness signal received by a gamma amplifier.

According to this construction, a gamma correction signal is produced from a brightness signal based on the above-described brightness ratio characteristic. That is, the display brightness is set to the maximum brightness using the first brightness correction ratio when the signal level of the brightness signal is the maximum signal level, while the display brightness is set lower than the value to be set using the second brightness correction ratio when the signal level of the brightness signal is lower than the maximum signal level. Thus, in the image displayed on the display, the degree of halation which may be caused around a subject having the highest brightness can be reduced, whereby other subjects having lower brightness located in the vicinity of that subject can appear distinguishable.

Meanwhile, "a brightness ratio characteristic in which a display brightness is set to a maximum brightness using a first brightness correction ratio when the signal level of the brightness signal is a maximum signal level and the display brightness is set using a second brightness correction ratio which is lower than the first brightness correction ratio when the signal level of the brightness signal is lower than the maximum signal level" can also be interpreted as "a brightness ratio characteristic in which a display brightness is set to a maximum brightness using an equi-proportional brightness correction ratio when the signal level of the brightness signal is a maximum signal level and the display brightness is set using a brightness correction ratio which is lower than the equi-proportional brightness correction ratio when the signal level of the brightness signal is lower than the maximum signal level."

A second aspect of the invention relates to a control method for a night vision system. The method includes the steps of receiving a brightness signal constituting an image signal indicative of an image to be displayed on a display; setting a display brightness to a maximum brightness using an equi-proportional display brightness correction ratio when a signal level of the brightness signal is a maximum signal level; and setting a display brightness using a display brightness correction ratio that is lower than the equi-proportional display brightness correction ratio when the signal level of the brightness signal is lower than the maximum signal level.

According to this method, a display brightness is set to a maximum brightness using an equi-proportional display brightness correction ratio when a signal level of the brightness signal is a maximum signal level; and a display brightness is set using a display brightness correction ratio that is lower than the equi-proportional display brightness correction ratio when the signal level of the brightness signal is lower than the maximum signal level. Thus, in the image displayed on the display, the degree of halation which may be caused around a subject having the highest brightness can be reduced, whereby other subjects having lower brightness located in the vicinity of that subject can appear distinguishable.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
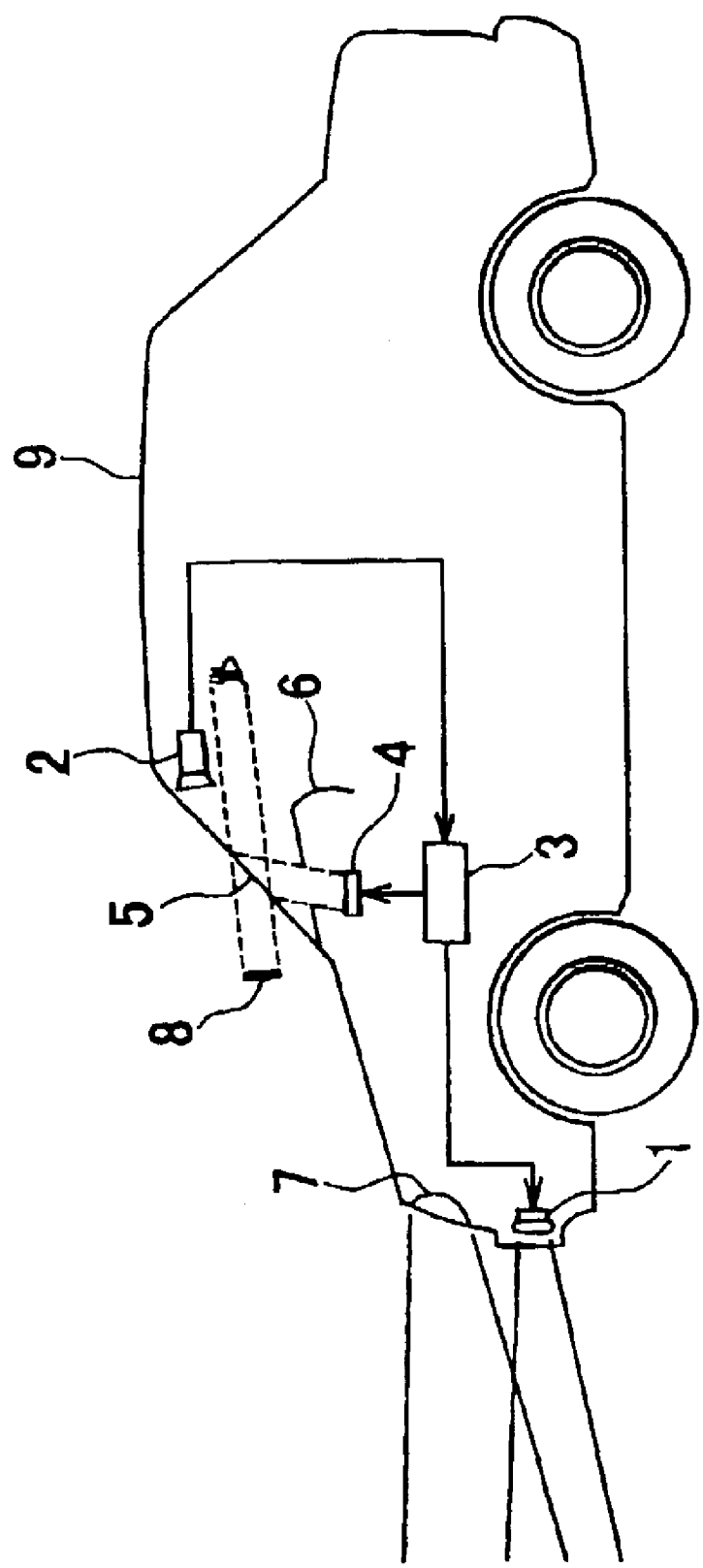
FIG. 1 is a view schematically showing a night vision system according to one embodiment of the invention, when it is mounted on a motor vehicle.

A preferred embodiment of the invention will hereinafter be described with reference to the accompanying figures. FIG. 1 schematically shows the construction of a night vision system according to the embodiment when it is applied to a head-up display system for vehicles. This night vision system includes a near-infrared lamp 1, camera 2, night vision control circuit (will hereinafter be referred to as "ECU") 3, liquid crystal display (will hereinafter be referred to as "LCD") 4 serving as a display device, and combiner portion 5.

The near-infrared lamp 1 is disposed in a front bumper of a vehicle 9 and is operated to project a near-infrared light including a light having a wavelength of 800 to 1000 mm in a forward direction of the vehicle 9. The camera 2 is adapted to receive the light from subjects, namely an image formed by the near-infrared light reflected from the subject, and output the captured image in the form of image signals.

In operation, the ECU 3 processes the image signals output from the camera 2 based on a certain brightness ratio characteristic, to be described later, and displays the image captured by the camera 2 on the LCD 4. The ECU 3 also controls the operation of the near-infrared lamp 1 and camera 2.

The LCD 4 is mainly constituted by a TFT type LCD panel including TFTs (Thin Film Transistors), and is disposed within an instrument panel 6 located in front of a driver. An image displayed on the LCD 4 is projected through an opening formed in the upper portion of the instrument panel 6 to the combiner portion 5, i.,e., a reflective portion (film) formed or attached on the front glass window of the vehicle 9. The projected image is then reflected by the combiner portion 5, thus appearing as a virtual image 8 to the driver's eyes as shown in FIG. 1. Therefore, the driver is able to observe the virtual image 8 and other subject located ahead of the vehicle at the same time by overlapping them. With this system, even when the driver is looking at a subject located ahead of the vehicle, he or she can easily capture the virtual image 8 created by the combiner portion 5 by only shifting a little his or her eyes.

Figure 2:
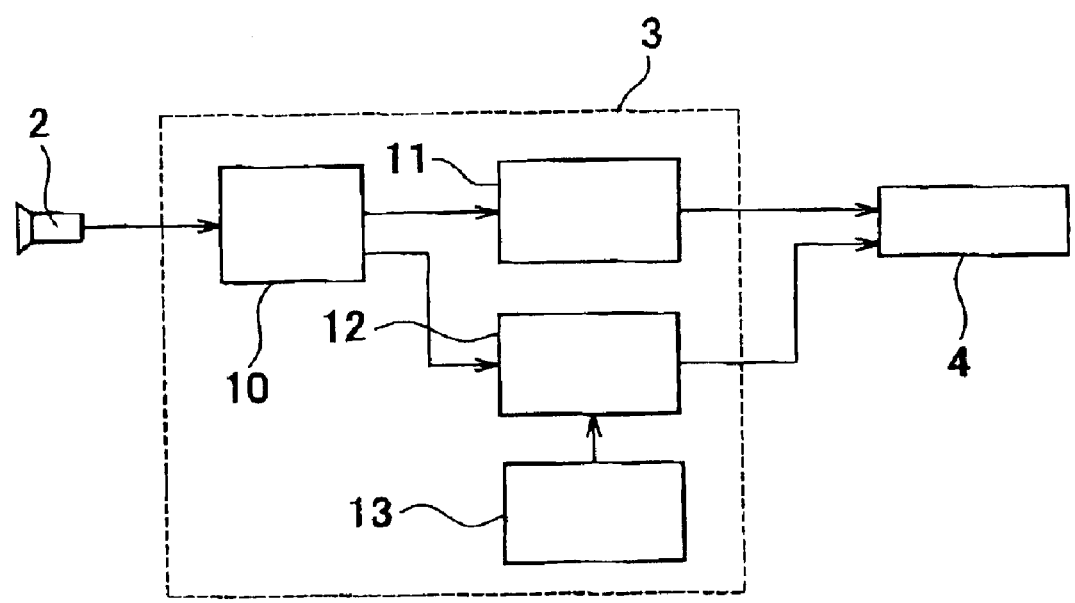
FIG. 2 is a block diagram schematically showing the configuration of main components of a control portion of the night vision system shown in FIG. 1.

FIG. 2 is a block diagram showing the functional configuration of a portion of the ECU 3 for controlling the operation of the LCD 4. Note that any other portions (functions) of the ECU 3 are not shown in FIG. 2.

Referring to FIG. 2, an image signal output from the camera 2 is input to a second circuit 10. Then, the second circuit 10 separately extracts a synchronization signal and a brightness signal indicative of the brightness of an image from the input image signal. A first circuit 11 receives the synchronization signal and supplies the LCD 4 with a drive-timing signal for adjusting horizontal and vertical synchronization thereof Though the image signal output from the camera 2 is a NTSC signal, it will be assumed in the following description that the signal output from the camera 2 is not a signal corrected through the gamma correction using a coefficient of 2.2 which is generally used according to the NTSC standard, but is just a brightness signal indicative of the brightness which changes in proportion to that of the subject.

Figure 3:
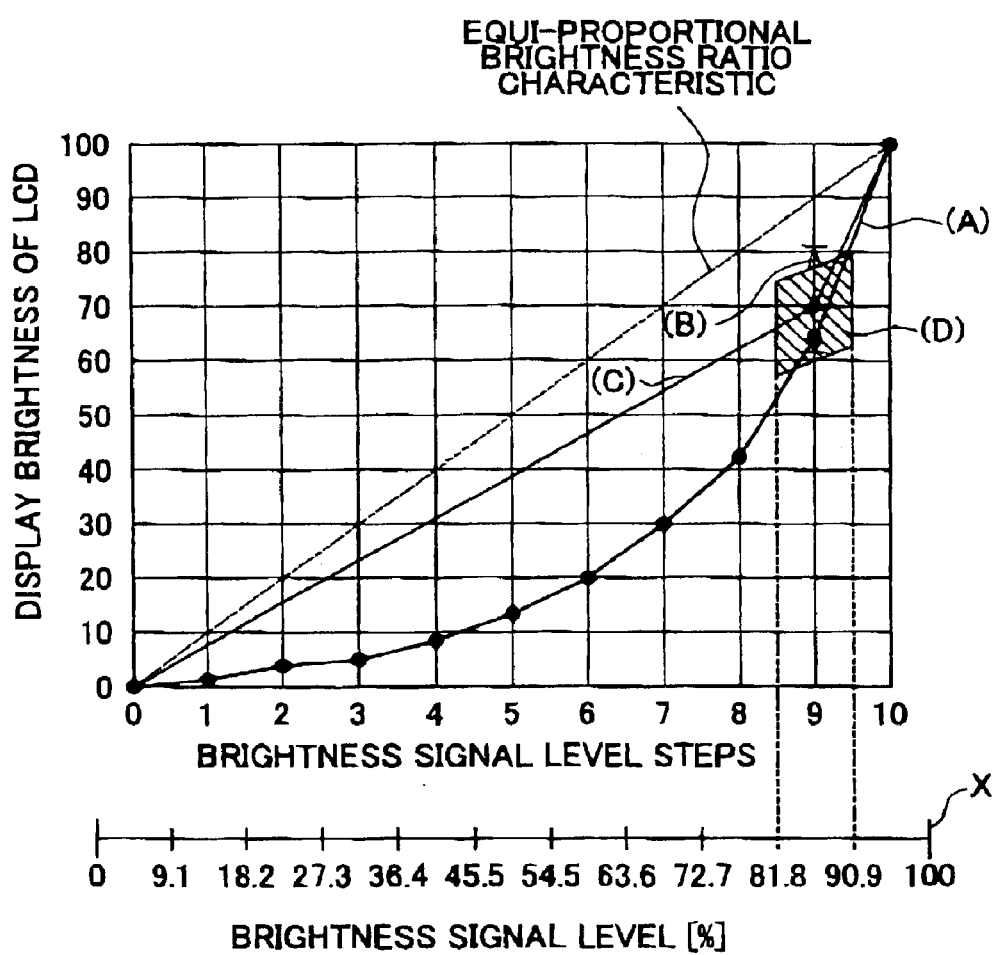
FIG. 3 is a graph showing a brightness ratio characteristic, based on which gamma correction signals are produced in the night vision system shown in FIG. 1.

A gamma amplifier 12 receives the brightness signal from the second circuit 10, and supplies the LCD 4 with a gamma correction signal produced based on the brightness ratio characteristic shown in a graph of FIG. 3. According to this characteristic, the display brightness of the LCD 4 is determined on the basis of the signal level of the brightness signal. The LCD 4 adjusts the vertical and horizontal synchronizations based on the drive timing signal and displays an image with the display brightness determined in accordance with the brightness ratio characteristic. A gamma adjuster 13 is adapted to adjust the brightness ratio characteristic by changing the amplification characteristic of the gamma amplifier 12. Thus, the second circuit 10, first circuit 11, gamma amplifier 12 and gamma adjuster 13 can be regarded as "controller" of the invention.

Referring to FIG. 3, a horizontal axis represents the signal level of the brightness signal input to the gamma amplifier 12. Here, the signal level of the brightness signal has a scale of 0 to 100% from black level to white level and is divided into 11 steps (steps 0 to 10), with the step 0 denoting 0%, the step 1 denoting 10%, and so on up to the step 10 denoting 100% which represents the maximum signal level. As shown in FIG. 3, the display brightness has a convex monotone increase characteristic with respect to the signal level of the brightness signal as represented by the continuous line A. Also, while the brightness ratio characteristic is represented as a sequential line in the graph of FIG. 3 for explanation, it is determined in actual practice such that it is represented as a smooth curve.

Meanwhile, the vertical axis of the graph of FIG. 3 represents the display brightness of the LCD 4. Here, each numeral of the scale represents the ratio with respect to the maximum display brightness (100).

A dotted line of FIG. 3 represents a brightness ratio characteristic which is normally used for displaying an image on a conventional TFT LCD. According to this characteristic, the display brightness of the LCD is equi-proportionally determined with respect to the signal level of the brightness signal output from the camera. Thus, the captured image is precisely reproduced on the LCD with the same level of brightness as that indicated by the image signal from the camera. When the display brightness is determined based on such an equi-proportional brightness ratio characteristic in all regions of an image, the difference in brightness between different high brightness regions of the image, such as regions having brightness corresponding to the steps 9 and 10 in FIG. 3, can not be large enough for the regions to appear distinguishable on the LCD, as described in detail in the following.

Figure 5:
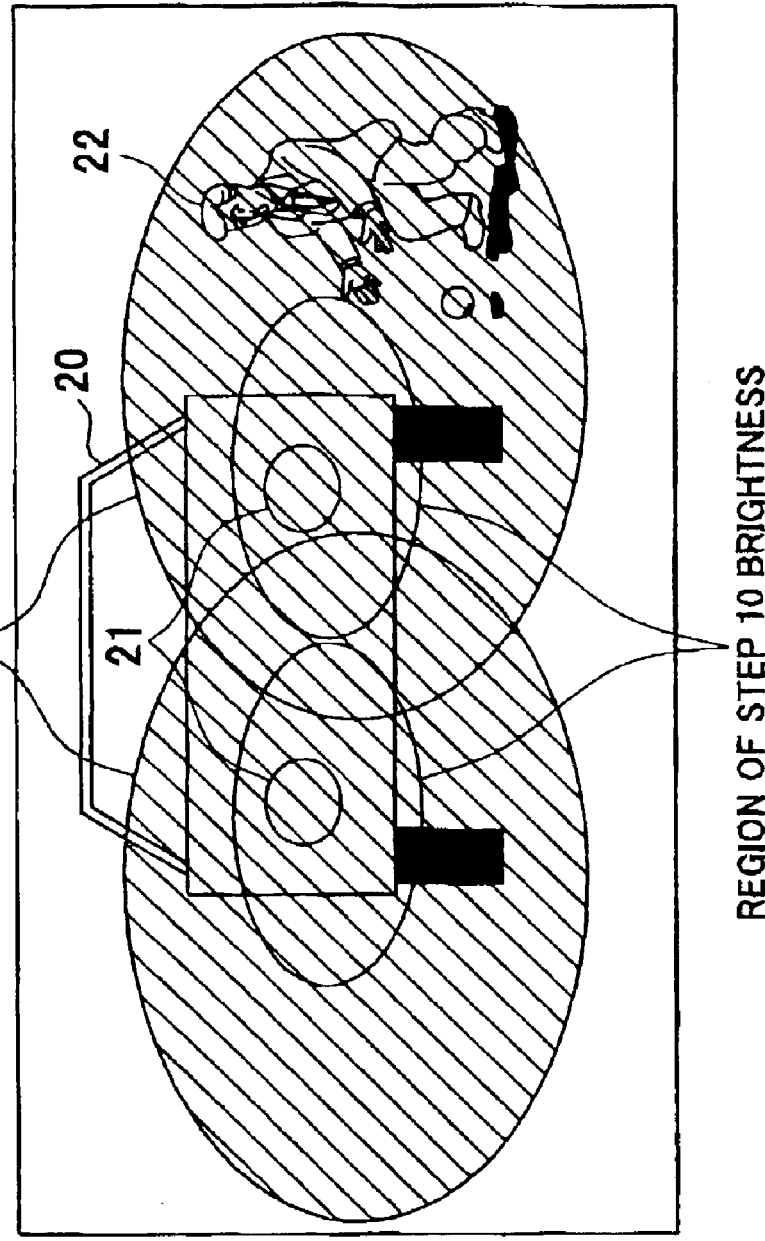
FIG. 5 is a view showing one example of an image in which a subject is obscured on the display due to the halation.

FIG. 5 shows one example of an image displayed on the LCD when the display brightness thereof is determined based on such an equi-proportional brightness ratio characteristic. As shown in FIG. 5, a man 22 located in front of an oncoming motor vehicle 20 is obscured on the display due to the halation caused by headlights 21 of the motor vehicle 20. In the image captured by the camera 2, however, a region covering the head lights 21 has the brightness corresponding to the step 10 which is the maximum brightness while a region surrounding that region has the brightness corresponding to the step 9. However, normally, when a camera receives an input indicating brightness higher than an upper limit value of the dynamic range of its sensitivity, the camera outputs a signal indicating a saturation level of brightness determined depending upon the saturation characteristic of photo detecting elements (e.g., CCDs) used in the camera. Thus, based on the brightness signal output by the camera, the area surrounding the headlights 21 and the image are displayed with the brightness of the step 10 on the display. Here, it is to be noted that the area of the region having the brightness corresponding to the step 9 depends on the signal level designated by the step 9 based on the brightness ratio characteristic represented by the dotted line of FIG. 3.

When the display brightness is set in accordance with the equi-proportional brightness ratio characteristic in all regions of the image, however, a man 22 of brightness corresponding to a step (e.g., step 7) lower than the step 9, that is located with in the region of the brightness corresponding to the step 9 (i.e., the region of the display brightness of 90) is obscured from view due to the halation caused by the head lights 21 and therefore does not clearly appear on the LCD.

Figure 4:
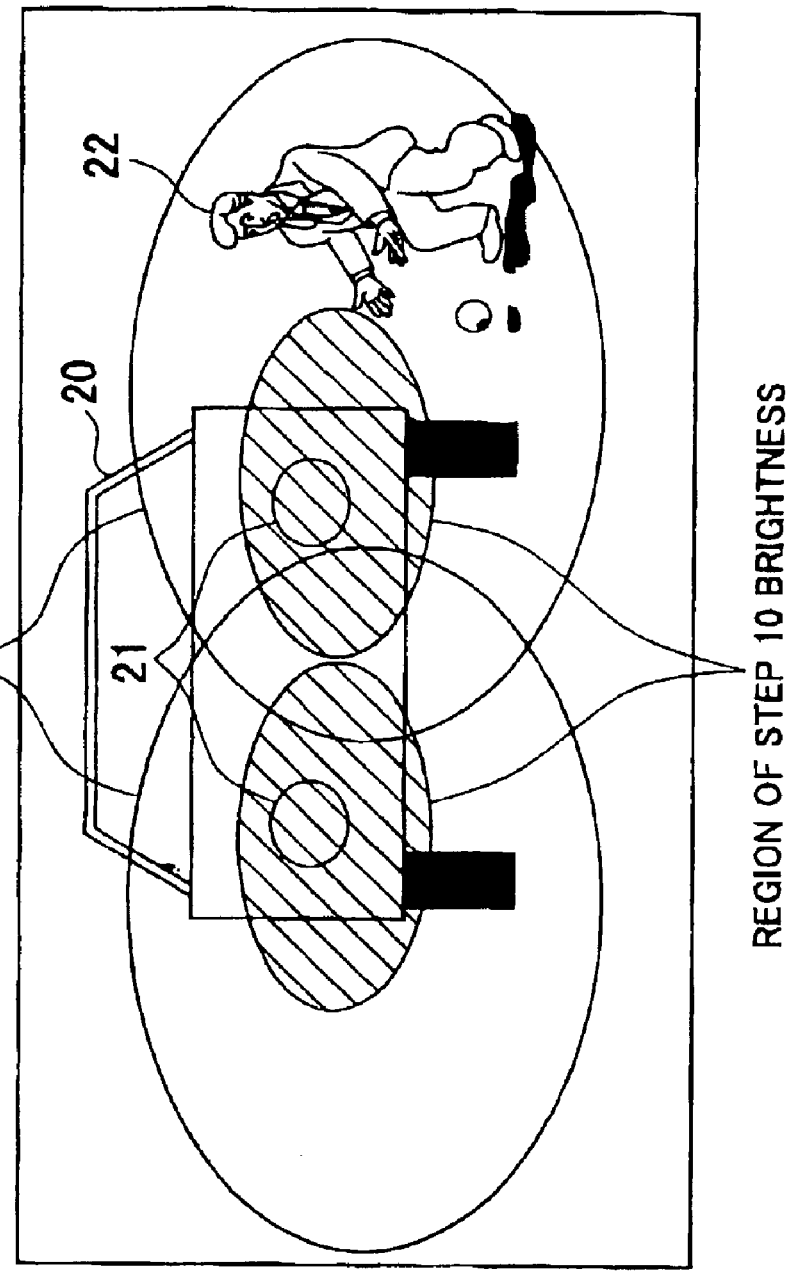
FIG. 4 is a view showing one example of an image on a display of the night vision system shown in FIG. 1.

According to the embodiment, therefore, the display brightness corresponding to the step 9 is set to 0.7 to 0.9 times the value to be set in accordance with the equi-proportional brightness ratio characteristic. More specifically, the display brightness corresponding to the step 9 is set using a display brightness correction ratio that is 70 to 90% of an equi-proportional display brightness correction ratio. That is, when the signal level of the brightness signal output from the camera 2 is 90%, the display brightness is set to 63 (90% ×0.7) to 81 (90% ×0.9) represented as a range B in FIG. 3. Thus, the display brightness corresponding to the step 9 is set to a lower value than a value determined based on the equi-proportional brightness ratio characteristic while the display brightness corresponding to the step 10 (i.e., the maximum signal level) is set to the maximum brightness using an equi-proportional brightness ratio characteristic. As a result, the difference in brightness between the region of the brightness corresponding to the step 10 and the region of the brightness corresponding to the step 9 becomes large, which means that the difference in brightness between the region of the brightness corresponding to the step 10 and that of a further lower step, such as the step 7, also becomes large. Therefore, as shown in FIG. 4, the degree of halation which may be caused by a high-brightness subject can be reduced, whereby lower-brightness subjects located around or in the vicinity of that high-brightness subject are not obscured from view due to the halation on the LCD 4. According to the embodiment, furthermore, the difference between the display brightness corresponding to the step 9 and that corresponding to the step 7 or a step close to the step 7 is not made large in order to achieve a high absolute brightness around the step 7. Therefore, the man 22 having the brightness corresponding to the step 7 or a step close to the step 7 is brightly displayed and does not become small on the LCD 4.

By the way, it has been discovered from tests executed under various conditions that a most faithful image can be displayed while preventing the lower-brightness subjects from being obscured due to the halation when the display brightness corresponding to the step 9 is set to about 72 (90% ×0.8).

The gamma adjuster 13 is used for adjusting the brightness ratio characteristic curve represented by the continuous line A or C in the graph of FIG. 3. For example, an operator of the night vision system of the embodiment may adjust the degree of amplification by the gamma amplifier 12 by operating a volume of the gamma adjuster 13 disposed on an instrument panel of the vehicle. Optionally, it may be automatically adjusted based on the intensity of external lights detected by actinometer (not shown) such that the display brightness corresponding to the step 9 reduces as it gets darker outside. In this case, the brightness ratio characteristic curves according to the intensity of external lights may be previously stored as maps on the ECU 3 and the automatic adjustment may be controlled by the ECU 3.

While the brightness ratio characteristic for displaying an image on the LCD 4 is provided as a discrete characteristic in which the signal level of the brightness signal is scaled from 0 to 100% and is divided into 11 steps in the embodiment, other brightness characteristics may be used as follows.

For example, the brightness ratio characteristic represented by a sequential line C of FIG. 3 rectilinearly connecting the steps 0, 9 and 10 may also be used. According to this characteristic, the display brightness corresponding to the step 9 is set to 70 that is 0.78 times the value to be set using the equi-proportional display brightness correction ratio. In this case, too, it is possible to sufficiently reduce the degree of halation while displaying an image with a gradation similar to the actual graduation.

Also, while the brightness ratio characteristic employed in the above-illustrated embodiment is determined such that the signal level of 90% corresponds to the step 9, it may also be determined as follows. That is, the horizontal axis of FIG. 3 representing the brightness signal level is scaled from 0 to 100% and divided into 11 steps of a predetermined range each, with the step 0 denoting 0 to 9.1%, the step 1 denoting 9.2 to 18.2%, and so on up to the step 10, which denotes 91 to 100%. In this case, when reducing the display brightness corresponding to the step 9 to 70 to 90% of the value to be determined based using the equi-proportional display brightness correction ratio, it means that the display brightness is set to a value selected from values within a square-shaped region D of FIG. 3 which is defined by two points each designating the display brightness of 57.3 (81.9% ×0.7) or 73.7 (81.9% ×0.9) with respect to the brightness signal level of 81.9%, and another two points each designating the display brightness ratio of 63.6 (90.9% ×0.7) or 81.8 (90.9% ×0.9) with respect to the brightness signal level of 90.9%. In this case, too, the same effects and advantages as those in the above-illustrated embodiment may be obtained since the signal level of the brightness signal has a monotone increase characteristic throughout the range from 0 to 100% as shown in the graph.

While the brightness ratio characteristic has been determined as a sequential line in the graph, it is determined so as to show a smooth curve in the graph in actual practice.

According to the above-illustrated embodiment, the display brightness of the image to be displayed on the LCD 4 is set using an equi-proportional brightness ratio characteristic when the signal level of brightness signal extracted from image signals is the maximum signal level, and the display brightness is set to 0.7 to 0.9 times the value to be set using the equi-proportional brightness ratio characteristic when the signal level is somewhat lower than the maximum signal level. Thus, the degree of halation which may be caused by a high-brightness subject, namely which is a subject of the highest brightness, is reduced, whereby lower-brightness subjects located around or in the vicinity of the high-brightness subject can appear distinguishable on the LCD 4. Furthermore, since the signal level of the brightness signal has a monotone increase characteristic throughout its range from 0 to 100% in the above-illustrated embodiment, the image can be displayed with a natural gradation that is similar to the actual graduation while reducing the degree of halation.

In the above-illustrated embodiment, the ECU 3 may be an analogue circuit, a digital circuit including a computer, or a hybrid circuit constructed by an analogue circuit and digital circuit in combination.

Also, while the camera 2 is adapted to receive near-infrared lights each projected from the near-infrared lamp 1 and having a wavelength from 800 to 1000 mm in the above-illustrated embodiment, the camera 2 may be adapted to receive near-infrared lights included in the light emitted from the head lights 7 of the vehicle 9 as well as the near-infrared lights each projected from the near-infrared lamp 1 and reflected by subjects and/or infrared lights emitted from the subjects and output image signals.

More specifically, when the camera 2 receives near-infrared lights included in the reflected light (the light emitted from the head lights 7), the brightness of the subject located in the near-infrared light region increases due to the near-infrared lights included in the reflected light. Then, by displaying this captured image (the brightness of the subject increases due to the near-infrared lights included in the light emitted from the head lights 7) on the LCD 4 with the display brightness set in accordance with the brightness ratio characteristic described above, the degree of halation which may occur in a high-brightness region of the image can be effectively reduced, whereby lower-brightness subjects located around or in the vicinity of that high-brightness region can be clearly displayed.

Regarding the infrared lights emitted from the subjects, for example, far-infrared lights emitted from living things can be used, because the intensity of the far-infrared lights is relatively high. That is, by capturing such far-infrared lights with the camera 2, the image of the subjects (living things) can be captured without a light source for illuminating those. Then, by displaying the captured image on the LCD 4 with the display brightness determined in accordance with the brightness ratio characteristic described above, the degree of halation can be reduced as in the case where the camera 2 is adapted to receive the near-infrared lights each projected from the near-infrared lamp or the near-infrared lights included in the lights emitted from the headlights 7. Accordingly, for example, even if a high-temperature source (e.g., a high-temperature muffler) is present in the vicinity of the subject (e.g. a person), the degree of halation which may be caused by the high-temperature source can be reduced, whereby the person can be clearly displayed on the LCD 4.

What is claimed is:

1. A night vision system, comprising:
    a device that emits electro-magnetic radiation towards a subject;
    a camera that captures an image of the subject illuminated by the device;
    a display, operably connected to the camera, that displays a captured image; and
    a controller that is operably connected to and controls operation of the device, the camera and the display, the controller including a second circuit, a first circuit, a gamma adjuster and a gamma amplifier, wherein the controller:
    receives a brightness signals, constituting an image signal indicative of an image to be displayed on the display from the second circuit;
    produces a gamma correction signal from the brightness signal based on a brightness ratio characteristic via the gamma adjuster in which a display brightness is set to a maximum brightness using a first brightness correction ratio when a signal level of the brightness signal is a maximum signal level, and the display brightness is set using a second brightness correction ratio which is lower than the first brightness correction ratio when the signal level of the brightness signal is lower than the maximum signal level; and
    outputs the produced gamma correction signal to the display via the gamma amplifier.

2. The night vision system according to claim 1, wherein the first circuit generates a drive timing signal in accordance with a synchronization signal constituting the image signal; and
    the display receives the gamma correction signal and displays an image with the display brightness set in accordance with the brightness ratio characteristic while synchronizing with the chive timing signal.

3. The night vision system according to claim 2, further comprising:
    a combiner portion which creates a virtual image by reflecting an image projected by the display, and
    the second circuit receives an image signal output from the camera and separately extracts the brightness signal and the synchronization signal from the received image signal.

4. The night vision system according to claim 3, wherein the night vision system is disposed in a vehicle.

5. The night vision system according to claim 4, wherein the device emits an infrared light, and the camera captures an image including the infrared light.

6. The night vision system according to claim 5, wherein the infrared light includes a near-infrared light.

7. The night vision system according to claim 1, wherein:
    the brightness ratio characteristic is determined such that the display brightness increases as the signal level of the brightness signal increases,
    the signal level is divided into a plurality of steps of a predetermined range each, and the brightness ratio characteristic is determined such that the display brightness is set to the maximum brightness using an equi-proportional display brightness correction ratio when a signal level of the brightness signal falls in a range of a step corresponding to a maximum signal level and the display brightness is set using a display brightness correction ratio which is 70 to 90% of the equi-proportional display brightness correction ratio when the signal level of the brightness signal falls in a range of a step which is one step lower than the step corresponding to the maximum signal level.

8. The night vision system according to claim 7, wherein the plurality of steps comprise eleven steps.

9. The night vision system according to claim 1, wherein the gamma adjuster adjusts the brightness ratio characteristic.

10. The night vision system according to claim 9, wherein the gamma adjuster adjusts the brightness ratio characteristic so as to change the second display brightness correction ratio used for setting the display brightness when the signal level of the brightness signal falls in a range of a step which is one step lower than the step corresponding to the maximum signal level.

11. A control method for a night vision system, comprising:
    emitting electro-magnetic radiation toward a subject;
    capturing an image including the electro-magnetic radiation reflected by the subject with a camera;
    outputting an image signal from the camera to a controller comprising a second circuit, a first circuit, a gamma amplifier and a gamma adjuster;
    inputting the image signal to the second circuit;
    receiving a brightness signal constituting a portion of the image signal indicative of an image to be displayed on a display;
    setting a display brightness to a maximum brightness using an equi-proportional display brightness correction ratio when a signal level of the brightness signal is a maximum signal level; and setting a display brightness using a display brightness correction ratio that is lower than the equi-proportional display brightness correction ratio when the signal level of the brightness signal is lower than the maximum signal level.

12. The method according to claim 11, further comprising displaying an image on the display with the display brightness set in accordance with the brightness ratio characteristic while synchronizing with a drive timing signal generated in accordance with a synchronization signal constituting the image signal.

13. The method according to claim 12, further comprising separately extracting the brightness signal and the synchronization signal from the image signal.

14. The method according to claim 11, wherein the electromagnetic radiation includes an infrared light.

15. The method according to claim 14, wherein the infrared light includes a near-infrared light.

16. The method according to claim 11, wherein:

the brightness ratio characteristic is determined such that the display brightness increases as the signal level of the brightness signal increases, the signal level is divided into a plurality of steps of a predetermined range each, and the brightness ratio characteristic is determined such that the display brightness is set to the maximum brightness using an equi-proportional display brightness correction ratio when a signal level of the brightness signal falls in a range of a step corresponding to a maximum signal level and the display brightness is set using a display brightness correction ratio which is 70 to 90% of the equi-proportional display brightness correction ratio when the signal level of the brightness signal falls in a range of a step which is one step lower than the step corresponding to the maximum signal level.

17. The method according to claim 16, wherein the plurality of steps are eleven steps.

18. The method according to claim 11, further comprising adjusting the brightness ratio characteristic.

19. The method according to claim 18, wherein the brightness ratio characteristic is adjusted so as to change the second brightness correction ratio used for setting the display brightness when the signal level of the brightness signal falls in a range of a step which is one step lower than the step corresponding to the maximum signal level.

20.The night vision system according to claim 1, wherein the gamma adjuster is a manual switch.

* * * * *